United States Patent
Wheeler et al.

(10) Patent No.: US 8,042,056 B2
(45) Date of Patent: Oct. 18, 2011

(54) BROWSERS FOR LARGE GEOMETRIC DATA VISUALIZATION

(75) Inventors: Mark Damon Wheeler, Oakland, CA (US); Jonathan Apollo Kung, Oakland, CA (US); Richard William Bukowski, Orinda, CA (US); Laslo Vespremi, Moss Beach, CA (US); Daniel Chudak, Berkeley, CA (US)

(73) Assignee: Leica Geosystems AG, Heerbrugg (CH)

( * ) Notice: Subject to any disclaimer, the term of this patent is extended or adjusted under 35 U.S.C. 154(b) by 958 days.

(21) Appl. No.: 11/080,212

(22) Filed: Mar. 15, 2005

(65) Prior Publication Data

US 2005/0223337 A1  Oct. 6, 2005

Related U.S. Application Data

(60) Provisional application No. 60/553,861, filed on Mar. 16, 2004.

(51) Int. Cl.
  *G06F 3/048* (2006.01)
(52) U.S. Cl. ......... 715/764; 715/767; 715/768; 715/782
(58) Field of Classification Search .................... 715/764
  See application file for complete search history.

(56) References Cited

U.S. PATENT DOCUMENTS

| 5,691,687 | A | 11/1997 | Kumagai et al. | 336/120 |
|---|---|---|---|---|
| 5,988,862 | A * | 11/1999 | Kacyra et al. | 703/6 |
| 6,222,937 | B1 * | 4/2001 | Cohen et al. | 382/154 |
| 6,420,698 | B1 | 7/2002 | Dimsdale | 250/234 |
| 6,604,068 | B1 | 8/2003 | Bukowski | 703/22 |
| 6,633,290 | B1 | 10/2003 | Kung et al. | 345/423 |
| 6,804,380 | B1 | 10/2004 | Ioannou et al. | 382/103 |
| 6,985,835 | B1 * | 1/2006 | Etzion et al. | 703/1 |
| 2003/0001904 | A1 * | 1/2003 | Rosen et al. | 345/848 |
| 2003/0013951 | A1 * | 1/2003 | Stefanescu et al. | 600/407 |
| 2005/0081161 | A1 * | 4/2005 | MacInnes et al. | 715/765 |
| 2005/0168460 | A1 * | 8/2005 | Razdan et al. | 345/419 |

* cited by examiner

*Primary Examiner* — Simon Ke
*Assistant Examiner* — Anil Kumar
(74) *Attorney, Agent, or Firm* — Maschoff Gilmore & Israelsen

(57) ABSTRACT

A representation of a physical object can be displayed even where the amount of geometric data is too large to be stored in resident memory. A primary viewing window displays point data for the object using a substantially even sampling of data at an appropriate point density for the system. At least one auxiliary viewing window displays a two-dimensional representation of the point data. A user can select a portion of the data in the auxiliary window(s), such as by selecting cells of an overlaid grid, to be displayed in the primary window using a rendering such as a "visible" rendering. The remainder of the displayed data can be displayed using a rendering such as a "hidden" or "transparent" rendering. The resolution of the selected region can be increased while maintaining a substantially even spacing among points for the region. The resolution of the unselected region can be decreased accordingly.

36 Claims, 10 Drawing Sheets

BROWSERS FOR LARGE GEOMETRIC DATA VISUALIZATION

CLAIM OF PRIORITY

This application claims priority to U.S. Provisional Patent Application No. 60/553,861, entitled "Browsers for Large Geometric Data Visualization," filed Mar. 16, 2004, which is hereby incorporated herein by reference.

TECHNICAL FIELD OF THE INVENTION

The present invention relates to the display and visualization of large amounts of three-dimensional data.

BACKGROUND

Efficient and effective 3D visualization is a common problem in the fields of computer aided design (CAD), geographic information systems (GIS), medical imaging, surveying/scanning (theodolites, total stations, GPS, airborne laser radar/scanning, terrestrial laser radar/scanning, photogrammetry), simulation, and animation. In all of these fields, the collection of large amounts of geometric information is becoming more commonplace.

Recent advances in technology such as LIDAR scanning technologies have resulted in the ability to collect billions of point samples on physical surfaces, over large areas, in a matter of hours. In a LIDAR process, a laser beam scans across a view that encompasses the structure of interest. The scanning device measures a large number of points that lie on surfaces visible in the scene. Each scan point has a measured location in 3D space, to within some measurement error, that typically is recorded relative to a point (x,y,z) in the local coordinate system of the scanner. The resulting collection of points is often referred to as one or more point clouds, where each point cloud can include points that lie on many different surfaces in the scanned view.

LIDAR systems are described, for example, in U.S. Pat. No. 5,988,862, filed Apr. 24, 1996, entitled "INTEGRATED SYSTEM FOR QUICKLY AND ACCURATELY IMAGING AND MODELING THREE DIMENSIONAL OBJECTS," which is hereby incorporated herein by reference. Other devices and methods of using these devices to capture and/or model data are described in U.S. Pat. Nos. 6,420,698; 6,604,068; and 6,633,290; each is which is incorporated herein by reference. An exemplary LIDAR system 100 shown in FIG. 1 utilizes a Field Digital Vision (FDV) module 102 that includes a scanning sensor for scanning an object 104, such as a building of a piece of machinery. The scanning sensor also can sense the position in three-dimensional space of selected points on the surface of the object 104. The FDV module 102 generates a point cloud 106 that represents the sensed positions of the selected points. The point cloud 106 also can represent other attributes of the sensed positions, such as reflectivity, surface color, and texture, where desired.

A control and processing station 108 interacts with the FDV 102 to provide control and targeting functions for the scanning sensor. In addition, the processing and control station 108 can utilize software to analyze groups of points in the point cloud 106 to generate a model of the object of interest 104. A user interface 118 allows a user to interact with the system, such as to view a two-dimensional (2D) representation of the three-dimensional (3D) point cloud, or to select a portion of that object to be viewed in higher detail as discussed elsewhere herein. The processing station can include any appropriate components, such as standard computer and/or processing components. The processing station also can have computer code in resident memory, on a local hard drive, or in a removable drive or other memory device, which can be programmed to the processing station or obtained from a computer program product such as a CD-ROM or download signal. The computer code can include instructions for interacting with the FDV and/or a user, and can include instructions for undertaking and completing any modeling and/or scanning process discussed, described, or suggested herein.

The FDV 102 can include a scanning laser system (LIDAR) 110 capable of scanning points of the object 104, and that generates a LIDAR data signal that precisely represents the position in 3D space of each scanned point. The LIDAR data signal for the groups of scanned points can collectively constitute the point cloud 106. In addition, a video system 112 can be provided, which in one embodiment includes both wide angle and narrow angle CCD cameras. The wide angle CCD camera can acquire a video image of the object 104 and provides to the control and processing station 108, through a control/interface module 114, a signal that represents the acquired video image.

The acquired video image can be displayed to a user through a display device 122 of a user interface 118 of the control and processing station 108. The display device can be any appropriate display device, such as a standard computer monitor. Through the user interface 118, the user can use an input device 124 to select a portion of the image containing an object to be scanned. The input device can be any appropriate input device, such as a keyboard, mouse, or stylus/touchpad. In response to user input, a processing device 116 of the control and processing station can provide a scanning control signal to the LIDAR 110 for controlling the portion of the surface of the object that should be scanned by the LIDAR. More particularly, the scanning control signal can be used to control an accurate and repeatable beam steering mechanism that steers a laser beam of the LIDAR 110. The narrow angle CCD camera of the video system 112 can capture the intensity of the laser returned from each laser impingement point, along with any desired texture and color information, and can provide this captured information to the control and processing station 108. The control and processing station can include a data processing system (e.g., a notebook computer or a graphics workstation) having special purpose software that, when executed, instructs the data processing system to perform the FDV 102 control and targeting functions, and also to perform the model generation functions discussed elsewhere herein. Once the object has been scanned and the data transferred to the control and processing station, the data and/or instructions relating to the data can be displayed to the user through the display device 122. Alternatively, the user can select instructions before or during the LIDAR scan. The data can be written to resident memory 120 during capture, and can be written to an external database 126 either during or after each scan (depending upon the size of the data set). Resident memory can include any available memory device local to the control and processing station, including but not limited to RAM memory. If multiple scans are taken, these data sets can be registered in the database 126 to form a single data set, for a total number of points less than about 40 million for current technology, or can be registered but left as separate data sets for point sets larger than 40 million points, in order to allow the data to be loaded into a computer for processing and/or analysis. Current computer systems can only handle about 10 million points efficiently, up to a maximum of about 40 million points through compression and other techniques, which also comes with decreasing performance and an increasing risk of crash problems as the size gets larger.

Volumetric methods can handle more than 40 million points, but volumetric representations only store an approximation of the scan points; the actual scan points are not available for processing. This simplification of the data can result in a loss of information and/or accuracy.

Current scanning technologies can achieve sampling rates of up to 1 million points per second, with an accuracy of a few millimeters. While these advances can greatly increase the accuracy and complexity of the generated models, the advances also come with problems such as how to store, visualize, manipulate, and/or extract models and measurements from very large amounts of data, particularly where the vast amount of data cannot simply be loaded into computer memory, measured, partitioned, and modeled. For instance, data sets used to contain less than a million points but now can contain over 200 million points. The inability to easily process the data is further complicated by the fact that data acquired by such scanners must undergo a series of processing steps to be used meaningfully, including the capture, registration, and fitting of the data.

Visual access and navigation of these large datasets is tedious and time consuming, as the amount of data involved can overwhelm most desktop computers. Further, the information is often spatially cluttered. This clutter can cause difficulty in seeing an object of interest that might be buried beneath or obstructed by several other objects. A system user can lose a sense of what is being looked at, as well as the location of the virtual camera on the three-dimensional (3D) data, as a computer monitor provides only a two-dimensional (2D) window on a 3D world.

A significant amount of manual preprocessing is involved to make portions of the datasets readily accessible. Typical preprocessing includes the defining of layers and the specification of named viewpoints. Automatic preprocessing can be used to make data access more efficient, by including spatial indexing on the data and using pre-computed occlusion culling.

Existing systems provide some tools to reduce complexity in viewing these data sets, such as adjustable near and far clip planes that hide geometry in front of, or behind, the planes. These clip planes are used to reduce the depth of visible geometry to a manageable size. Limit boxes can be used to provide a 3D box of visibility that a user can adjust to focus on a particular local region of space. Geometry outside the box is hidden, while geometry within the box is visible. Layer tools can be used to allow users to place portions of geometry on different layers, such that the portions can be hidden or shown on a per layer basis. Fencing tools allow users to specify a region of the projected geometry that can then be hidden (or revealed) by the user. Maps and site plans can be used as a visual aid to navigation to reduce the difficulty in determining location/orientation.

These tools fail to solve many of the above-listed problems, as the data is separated into blocks or sets that are stored separately. This can not only increase difficulty in querying the data, but can cause problems where a view spans a number of blocks and the number of blocks is too large to be stored in memory. Further, the need for pre-processing using the above-described tools takes up valuable time and resources. These approaches do not allow a user to quickly identify sections of a data set to hide, or make transparent, such that the user can efficiently focus on a specific section of the data.

DETAILED DESCRIPTION

Figure 1:
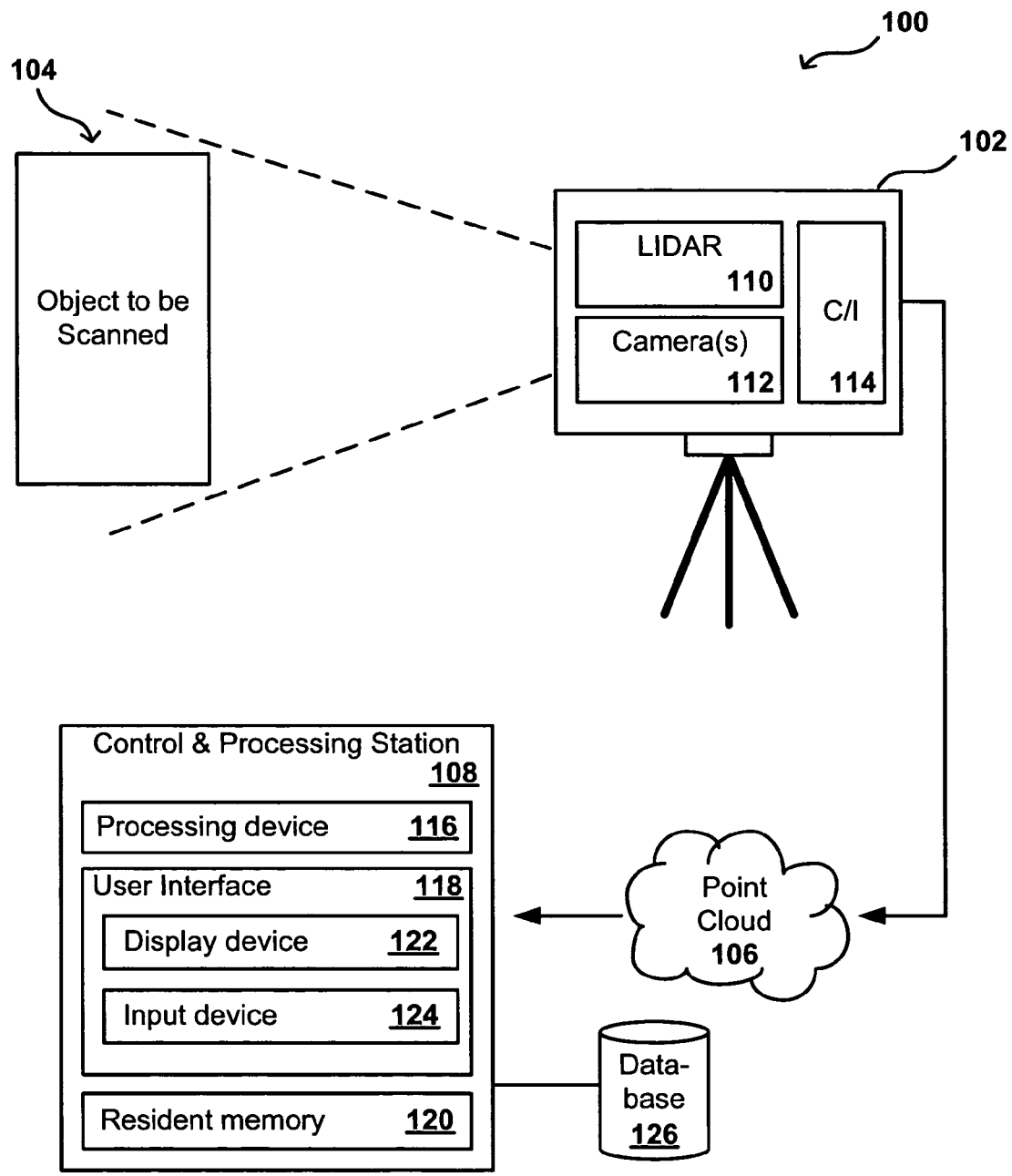
FIG. 1 is a diagram of a scanning laser survey system that can be used in accordance with one embodiment of the present invention.

Systems and methods in accordance with embodiments of the present invention can overcome deficiencies in existing approaches by changing the way in which data is retrieved and displayed to a user. Such systems can provide for partitioning of a data set in real time. These systems also can manage large amounts of data, such that a user need not worry about the size of a view selection box exceeding the storage capacity of the workstation. Embodiments of the present invention can most advantageously be used with data sets that are too large to fit into memory on the computer or workstation, and/or that can be too large to display to the user. Embodiments can also be used advantageously where the amount of data causes slowdowns in processing or rendering, such that the reduction in point total or density can increase the speed of the system. It can be preferable for the data to be stored in an easily accessible manner, such as is described in U.S. Patent Application Ser. No. 11/076.220, entitled "SYSTEM AND METHOD FOR EFFICIENT STORAGE AND MANIPULATION OF EXTREMELY LARGE AMOUNTS OF SCAN DATA," filed Mar. 9, 2005, which is hereby incorporated herein by reference. In an example described therein, the data is stored in a tree of spatial blocks at a number of body levels, each block including spatial information for the points included therein. This storage approach allows subsets and selections of data to be quickly selected and loaded without the need to view, scan, or analyze blocks that are not to be included in the subset. Further, such a storage approach allows the blocks to be loaded at any appropriate resolution or density, such as a resolution that is low enough for the selected points to be loaded into memory and/or be displayed to the user, regardless of the size of the data set. The resolution can be set by the system and/or selected by the user. Such a storage approach also allows actual point data to be displayed to the user. The point data can be for a single scan, or for multiple scans of a physical object that have been registered and combined into a single, spatially organized data set. The scan data can come from any appropriate scanning system, such as a scanning LIDAR system described above.

An exemplary system in accordance with one embodiment allows a system user to easily hide or show portions of a set of three-dimensional (geometric/geospatial) data, independent of the size of the data set. For example, if a user selects cells representing a portion of the geo-data in three-dimensional space, the system can load points only in that portion of the space. The system also can load points for that portion up to the maximum memory capacity of the system or workstation. For a data set of ten million points, this might correspond to a portion that includes about 3 million points. The data set can be set up such that an evenly-spaced selection of points can be loaded for the selected third. If the workstation can only handle up to 2 million points, then the data set can be queried to provide an evenly-spaced set of data for the selected portion that includes up to 2 million points. The number of points can further be limited when displayed, as a display might only be able to show up to 1 million points, and it is desired to display actual point data and not a volumetric representation thereof.

A user also can choose to make portions of the data set at least partially transparent, allowing an area of interest to be seen while maintaining the surrounding context and keeping the transparent portion(s) in memory. The system can include a principal viewer allowing the data to be viewed, such as in a CAD/GIS environment. The 3D geometric/geospatial data will be referred to herein as "geo-data." A principal viewer 200 can be used to present a 2D perspective, or orthographic projection, of the 3D geo-data through a virtual camera. The virtual camera can provide a point of view for the data being displayed. There can be more than one principal viewer, each providing a different view of the geo-data. Each principal viewer 200 can be augmented with visual navigation tools that allow the user to quickly locate and orient the virtual camera in order to get a clear view of the geo-data of interest.

Figure 2:
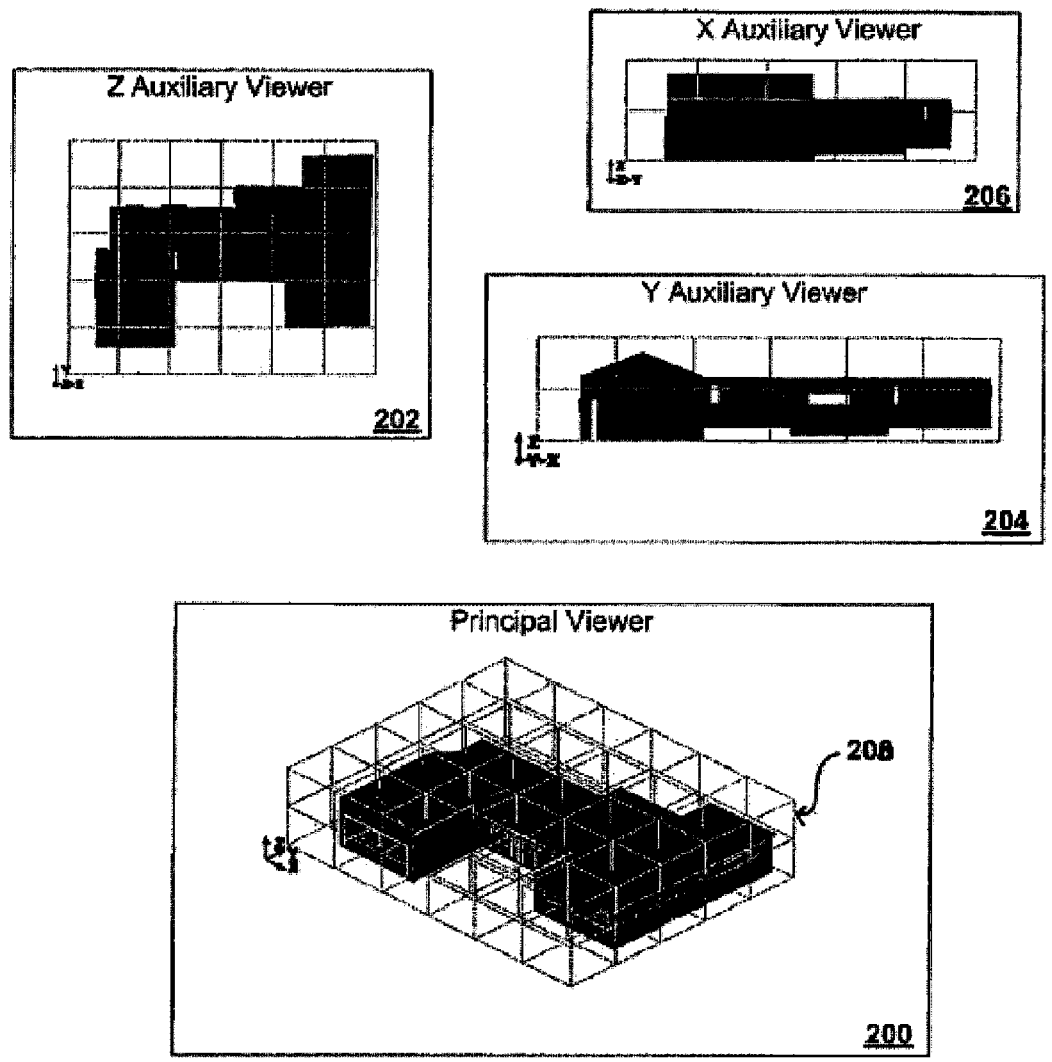
FIG. 2 is a diagram showing three auxiliary viewers alongside a principal viewer that can be used in accordance with one embodiment of the present invention

A 3D grid 208 of rectilinear boxes, referred to herein as "grid cells," can be established to enclose the geo-data. At least one auxiliary viewing window, or "auxiliary viewer," can be used in addition to the primary viewer, or as a window in the primary viewer. An auxiliary viewing window can present the user with at least one 2D representation of the geo-data overlaid with the grid cells, allowing a user to more easily select data to be rendered in the three-dimensional representation of the primary viewer. The 2D views can be orthographic views along the principal axes of the grid cells. For instance, FIG. 2 shows a view of the geo-data from a perspective view in the primary viewer 200, while three separate auxiliary viewers 202, 204, 206 show the geo-data from the z, y, and x directions, respectively. Alternatively, there could be a single auxiliary viewer that can alternate between the z, y, and x directions. These views facilitate the selection of subsets of the grid of cells, as well as the application of operations on selected subsets to change the graphics rendered in the principal viewer. The user can thereby quickly and clearly isolate regions of the geo-data that are of interest in the principal viewer. The selection and movement or adjustment of cells can be difficult using the perspective view of the primary viewer.

Figure 3:
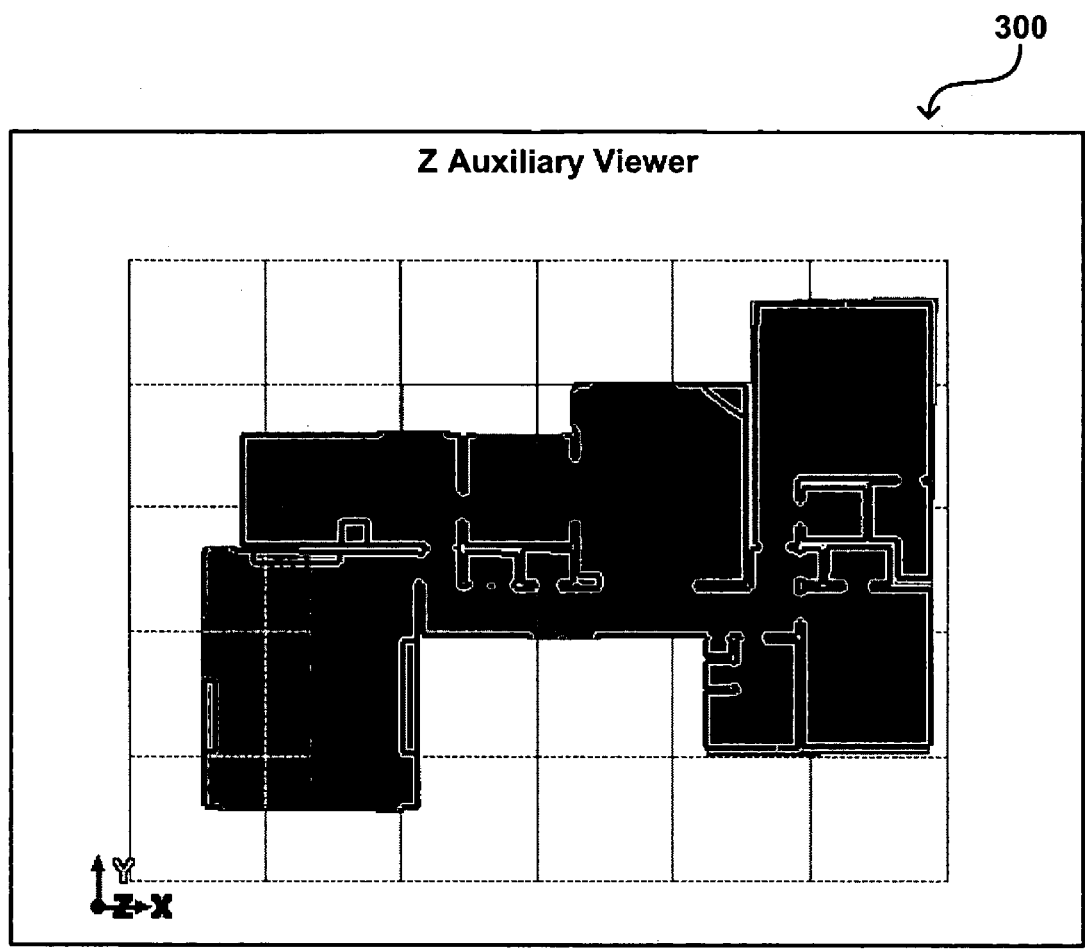
FIG. 3 is a diagram showing a site plan overlaid on an auxiliary viewer for the Z axis in accordance with one embodiment of the present invention.

A site plane or map can be useful to overlay on each of the auxiliary viewers, in order to provide a clear and simple global view of the entire space of the geo-data. An example of a site plan overlay 300 in an auxiliary viewer is shown in FIG. 3. A site plan or map can be overlaid on top of, or in place of, the geo-data. A toggle switch or other switching device can be provided to switch any of these plans, as well as the geo-data, between visible and hidden in the auxiliary viewers, allowing the user to use the most effective view for each of the auxiliary viewers. Without a site plan, the coarse view of the geo-data can provide an outline of the data and details that are visually similar to a site plan. The apparatus can be used with or without the aid of a site plan or map.

Once displayed, a user can select subsets of these 3D grid cells. The cells can be selected by any appropriate means, such as by using a computer mouse to click on each individual cell, drag a cursor over a number of cells, or create a fence that selects multiple cells by intersection or containment. It can be easier for a user to select cells based on the 2D displays in the auxiliary viewers, as discussed elsewhere herein. Since each auxiliary viewer can present a 2D overlay grid of the 3D grid of cells from a specific orthographic viewpoint, there can be multiple 3D cells that project to the same 2D cell position in the 2D view. These 3D cells are referred to herein as the "members" of that 2D cell with respect to that view. The set of selected 3D grid cells will be referred to herein as the "selection set." Each 3D grid cell also can have a "selection state" indicating whether the cell is in the current selected set. Once selected, these cells can specify which regions of space are to be shown and which regions are to be hidden in the principal viewer.

Several modes and/or mechanisms can be made available to the user, allowing the user to efficiently select the grid cells through serial adjustment of the selection state of the grid cells. The user can click on or inscribe one or more 2D cells in any one of the auxiliary viewers. Each auxiliary viewer can behave similarly and the selection state, which is common/shared among the auxiliary viewers, can be visualized by highlighting the selected 2D cells in each of the auxiliary viewers. If any 3D cell members of a 2D cell are selected, that 2D cell can be highlighted in that particular view. By mixing these modes appropriately, the user can efficiently obtain the desired selection state.

The user can choose a logical mode for selection and a geometric mode for the identification of a set of cells. Logical modes that can be used to specify how an identified group of cells affects the selection state of those cells, and possibly non-identified cells, include an additive mode, a subtractive mode, an intersection mode, and an inversion mode. In an additive mode, the selection state of the identified cells can be set to selected, regardless of previous selection state, with the state of the non-identified cells being unaltered. In a subtractive mode, the selection state of the identified cells can be set to unselected, regardless of previous selection state, with the state of the non-identified cells being unaltered. In an intersection mode, identified cells that have been selected are marked as selected, and all other cells are marked as unselected. In an inversion, the selection state of the identified cells are inverted, such that unselected cells are marked selected and cells that are selected are deselected. The state of the non-identified cells is not altered.

Figure 4:
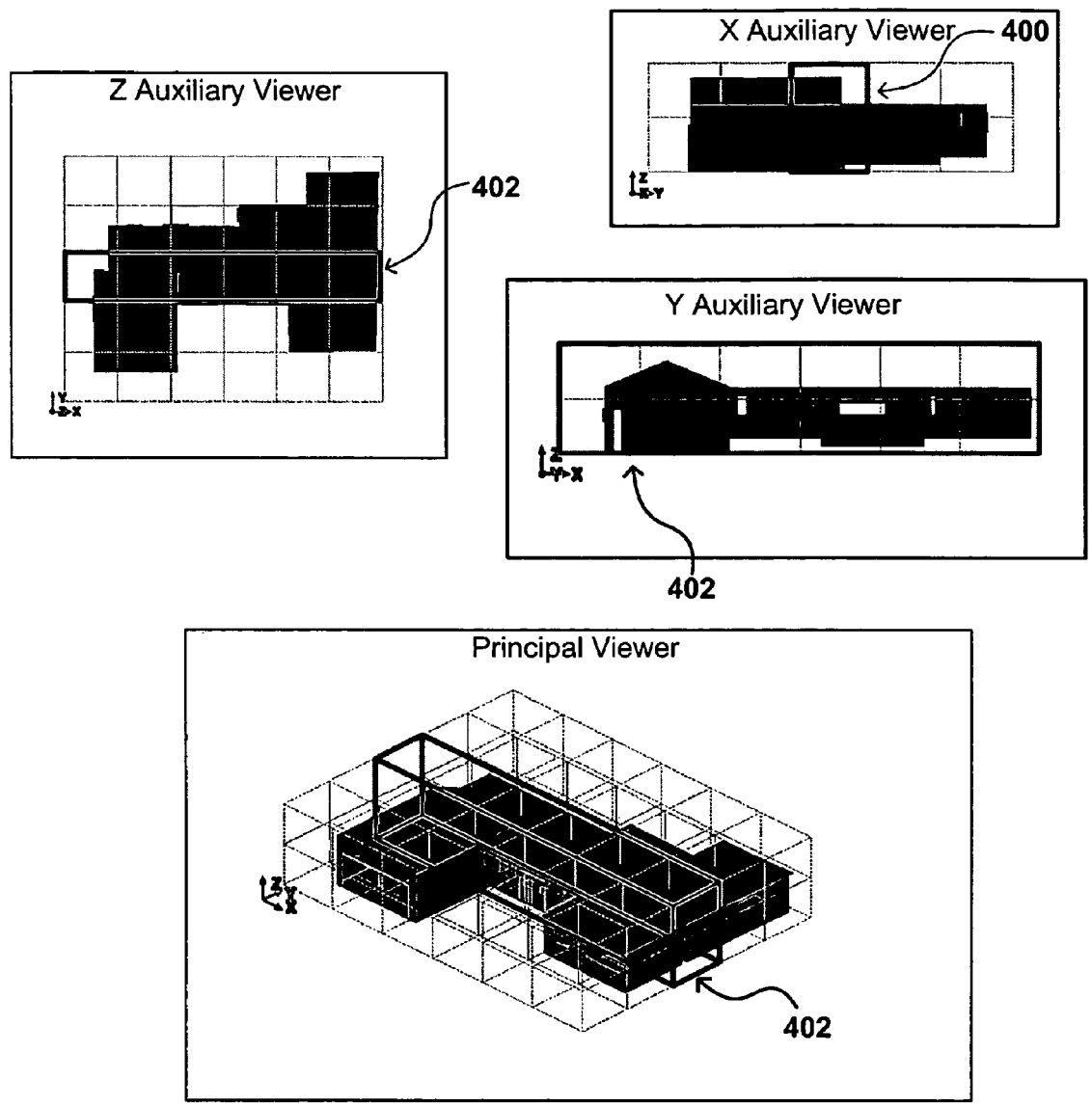
FIG. 4 is a diagram showing a row selection cell used with the viewers of FIG. 2.

A number of modes of identifying cells or groups of cells can be used. One such mode is a single cell selection mode. In this approach, only a single cell from the grid can be selected for viewing. Another possible mode is a row selection mode, such as is shown in FIG. 4. Here a user can select at least one 2D cell 400 in an auxiliary viewer, but the action will affect the entire row of 2D cells. The row selection 402 is shown in the other auxiliary viewers, as well as the primary viewer. Column selection modes can be used that work just like row selection modes, except that selecting a 2D cell selects all the 2D cells in that column.

A fence selection mode can be used to allow a user to draw a 2D object 500, such as by using a computer mouse, over the 2D cell grid in one of the auxiliary viewers: The 2D object 500 can be any appropriate 2D shape, such as a polygon, triangle, rectangle, circle, or ellipse. Drawing the 2D object 500 can select all 2D cells that are considered to be contained by the polygon. In an alternative embodiment, the 2D object selects all cells that are at least partially contained within the 2D object, such as is shown in FIG. 5.

Operating on Selected Cells

Figure 5:
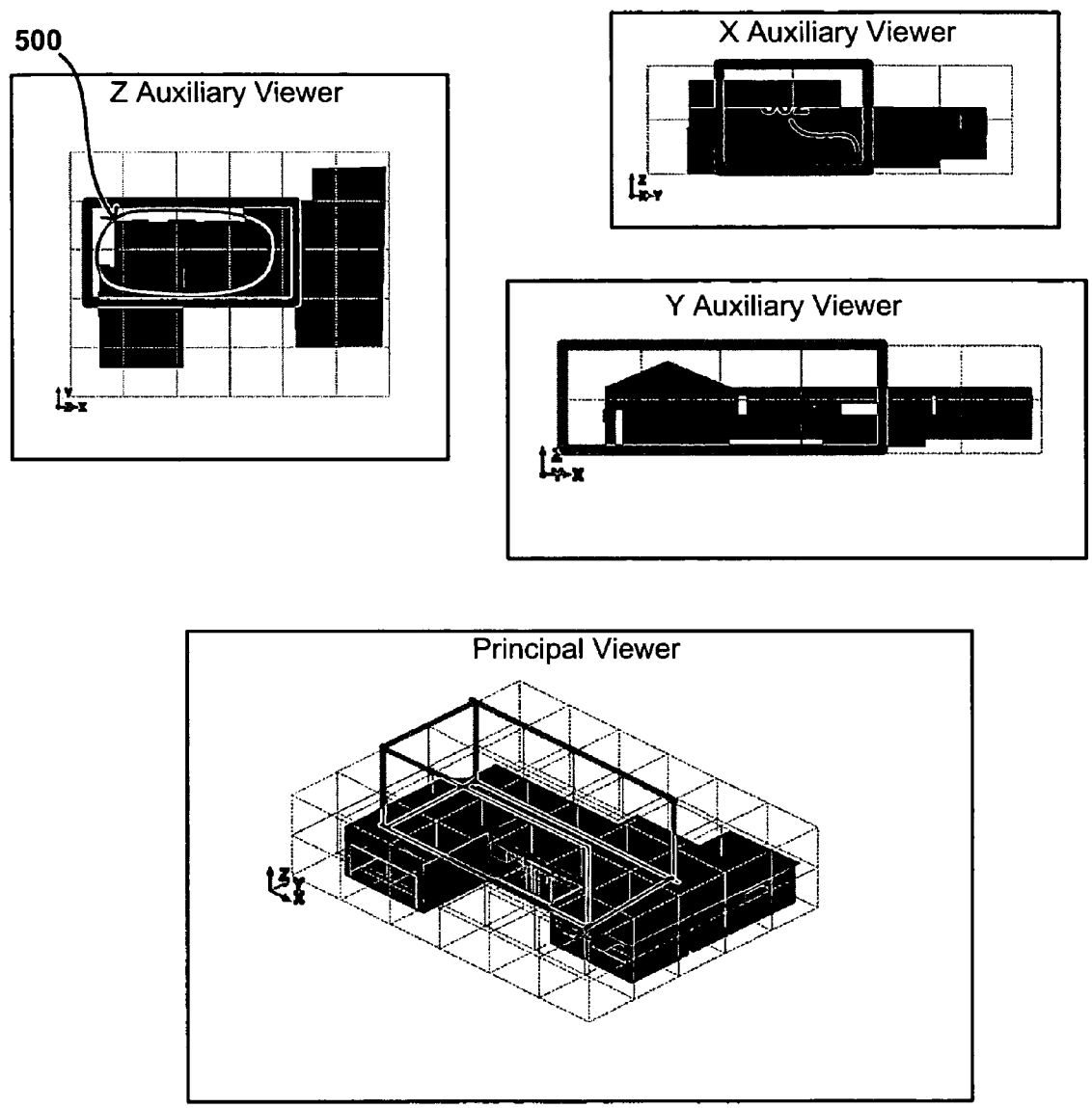
FIG. 5 is a diagram showing a user-defined fence used with the viewers of FIG. 2.

Once a user establishes a desired selection state for the 3D grid cells, using a selection method such as those described with respect to FIGS. 4-5, the user can change the way data in these grid cells is rendered in the principal viewer. For example, the contents of a specified cell can be made to be visible or invisible in the principal viewer. As discussed above, these cells can be specified via a selection operation, such as by selecting cells, deselecting cells, or leaving selection states of various cells unchanged. The contents of a specified cell alternatively can be made transparent in the principal viewer. Transparency of a cell allows the user to visualize the area of interest while providing the context of surrounding geo-data. For transparency changes, the user can be presented with mechanism to specify level of transparency between 0% (opaque) and 100% (fully transparent). A preferred level of transparency in at least one embodiment is about 30%, in order to provide a view of the desired area while still maintaining sufficient context.

There can be a number of functions or operations allowing a user to adjust the rendering of specified cells in the principal viewer. These operations can be applied to selected and/or unselected sets, depending on the operation and the choice of the user. One such operation includes a hide operator, which can be used to hide any geo-data in the principal viewer that which resides in a specified 3D cell. A reset operation can be used to return the specified cell(s) to the default rendering, such as displaying all the 3D cells in the principal viewer.

Figure 6A:
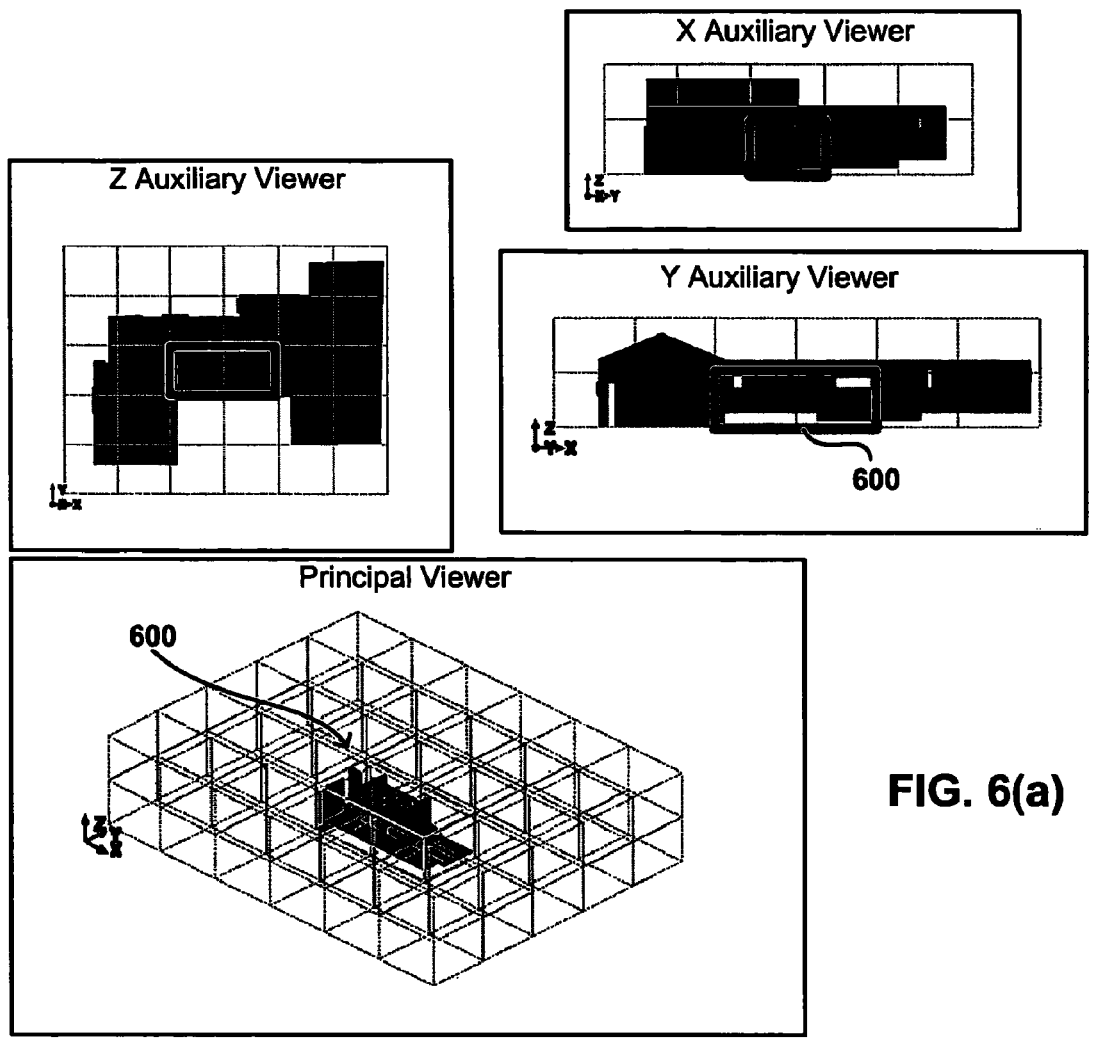
FIG. 6 is a diagram including the viewers of FIG. 2 showing geo-data where (a) the unselected cells are to be hidden and (a) the unselected cells are to be transparent.
Figure 6B:
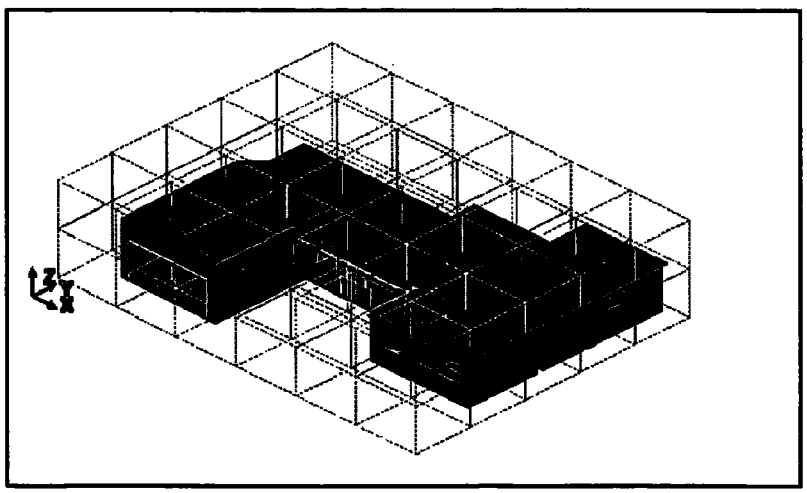

An adjust rendering operator can be used to adjust how geo-data in the specified cells is rendered. An adjust rendering operator can include any of a number of options, such as a "Make Transparent" option that makes transparent all geo-data in the principal viewer that lies in any of the specified 3D cells. FIG. 6(a) shows an example of a selected set of grid cells in the auxiliary viewers, where the user has opted to hide the unselected cells. As such, only the geo-data in the selected cells is visible in the principal viewer. FIG. 6(b) shows the result of the user instead choosing to make transparent (30% transparent in this example) the geo-data 604 in the unselected cells.

An "Adjust Level of Detail" option can allow an operator to select that specified cells be rendered with a specified level of detail. As discussed elsewhere herein, cells can be rendered at an evenly-spaced sub-sampling of the available points, in order to allow the entire physical structure to be loaded into memory and viewed in the primary viewer. Using a lower initial resolution also helps to reduce complexity and decrease the necessary rendering time. Once a selection of cells to be viewed has been made, the user can choose to increase the displayed resolution of the selected cells to increase the level of detail. This can involve loading additional point data, since the data displayed includes actual point data and not a volumetric representation of the data. The increase in detail can be done by block levels in the data structure, or can be accomplished through a data query to get a specific number of data points.

A "Change Color Mapping" operator can be used to allow the user to specify that specified cells be rendered in different colors, or with a different mapping. For instance, a user might want to render the majority of cells in black and white, while rendering cells of interest in color in order to make those cells distinct.

A grid adjustment mechanism can be provided that allows a user to adjust the size and/or number of cells in the grid. A user can adjust sizes and positions, for example, by using a computer mouse as known in the art to drag edges of the cells, either 3D cells in the primary view or 2D cells in the auxiliary viewers, in order to increase or decrease at least one dimension of a cell. It can be desirable in at least one embodiment for the user to adjust 2D cells, which then adjusts the entire row or column accordingly. For example, a user can specify the height of one row to be different than the height of other rows, such as to accommodate a building model with levels of cells corresponding to different floors, where there are different heights for different floors. The user also can be allowed to change the sizes and positions by adjusting the dimensions of the cells, such as through a dialog box that presents dimensions for parameters such as the size of grid cells, the size of the entire grid, and the number of cells along each principal axis.

Such a mechanism also can allow the user to rotate and/or translate the position of the grid position on the geo-data. For example, a user might wish to rotate the grid such that an X-Y plane (or plane formed by two primary grid axes) is parallel to, or corresponds with, the floor plane of a building. A user also might wish to rotate the grid such that a primary axis of the grid corresponds with a primary axis of the object being viewed. Aligning the grid and the object can simplify the selection of specific areas of interest through the auxiliary cells. A user can align the grid to the model by any appropriate means, such as by dragging a corner of the grid using a mouse or other input means, adjusting parameters of the grid through a data entry window, or selecting an axis or plane of the displayed geo-data to which the grid can "snap" as known in the art.

A window or panel can be used to display information about the cells, such as a tabular list of cell parameters in text format. Each row in the table can contains an entry for a different cell, including information such as: the cell name, which can be created automatically when the grid is established; the size of the cell; the position of the cell, such as a center position or two corner positions of the cell; a visibility state; and a transparency state. Modifications in the tabular list or auxiliary viewer can be reflected immediately in other lists and/or viewers. The following table is an example of a tabular view of the cells:

| Cell Name | Center | Width | Depth | Height | Visible | Transparency |
|---|---|---|---|---|---|---|
| Cell 1 | 10, 10, 2 | 3 | 4 | 5 | Yes | 0% |
| Cell 2 | 13, 10, 2 | 3 | 4 | 5 | No | 0% |
| Cell 3 | 16, 10, 2 | 3 | 4 | 5 | Yes | 80% |
| ... | | | | | | |
| Cell 10 | 10, 14, 2 | 3 | 4 | 5 | No | 0% |
| ... | | | | | | |
| Special Box | 14, 12, 1 | 2 | 2 | 1 | Yes | 0% |

Figure 7:
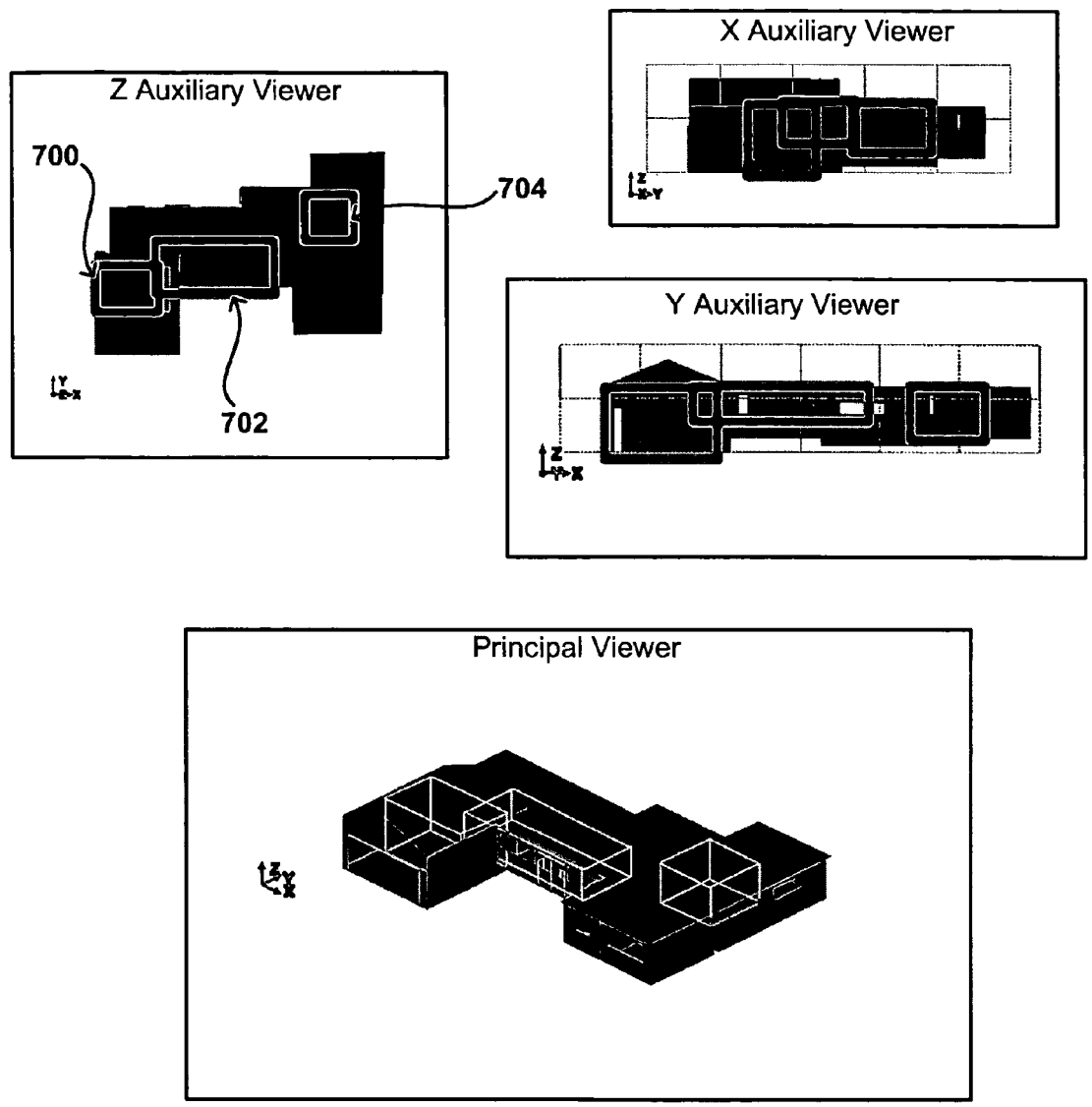
FIG. 7 is a diagram showing a set of arbitrarily sized, non-aligned cells used with the viewers of FIG. 2.

An alternative embodiment can present a list of selected cells as a list of arbitrarily sized rectilinear 3D cells, instead of a list of cells that are restricted and/or aligned to a grid. An example of such an arrangement of cells is shown in FIG. 7. In this embodiment, the boundaries of selected cells 700, 702, 704 can be overlaid on the auxiliary viewers. Cells can be added or deleted from the list, with these changes immediately reflected in the auxiliary and principal viewers.

Cells can be created using a number of different methods. For example, cells can be created by manually entering coordinate values of the minimum and maximum corner positions, or by manually entering coordinate values of the center point along with information about the height, width, and depth of the cell. A cell also can be created by selecting a geometric object or set of objects and creating a cell that tightly bounds the selected objects. A cell can be created by picking a point in the geo-data and specifying that point as a specific corner of a cell, or the center point, and entering the height, width, and depth of the cell. A cell also can be created by selecting two points in the geo-data for opposing corners of a rectilinear cell. A cell also can be created by selecting a center point and specifying a radius of the cell. A cell also can be created by selecting three or more points in the geo-data and creating a cell that tightly bounds the selected points.

Two or more 3D cells also can be selected that overlap, such that some data points will be contained in both cells. When cells overlap, a "precedence" determination can be set as to how the common points are to be rendered when each cell has a different rendering selection. The use of precedence indicates to the system how a user wants data to be displayed where that data is subject to two or more rendering criteria, such as being in an unselected cell that is to be hidden, but inside a fence region that is to be shown. In another example, a cell might be a member of a row that is set to be hidden and a column that is set to be transparent. In an exemplary precedence configuration, hidden cells can be set to override transparent and opaque cells, with transparent cells overriding opaque cells. If a portion of space is covered by a hidden cell and a visible or opaque cell, for example, that portion will be hidden in the principal viewer. A user can select a precedence configuration before the data is displayed, and/or can adjust the precedence at any time.

Figure 8:
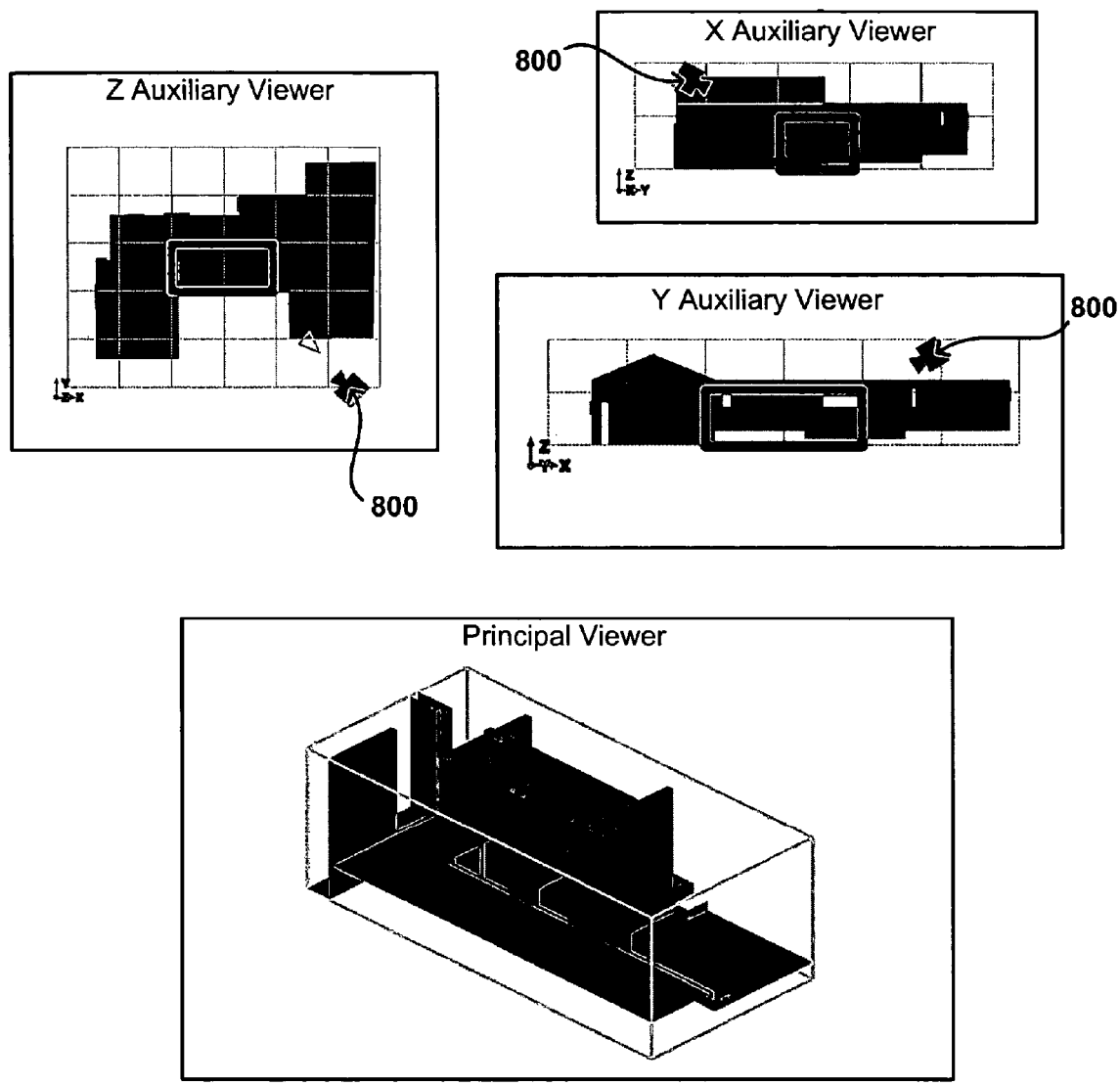
FIG. 8 is a diagram showing the use of a virtual camera with the viewers of FIG. 2.

As mentioned above, a principal viewer can provide a view of the geo-data from a virtual camera in the 3D space of the geo-data. In this case a virtual camera is a point of view inside the geo-data space from which the data is displayed. In auxiliary viewers, a graphical symbol 800 depicting the position and orientation of the virtual camera can be overlaid as shown in FIG. 8, such that the user can know in each dimension exactly where the virtual camera is located. This can be useful, for example, where the interior of a building is being viewed. The primary view can be moved to show the interior of various rooms, while the auxiliary viewers will allow the user to easily determine which room is being viewed.

In one embodiment, a user can select a graphical symbol displayed in any of the auxiliary viewers and adjust the position of the virtual camera by selecting and dragging the camera within the auxiliary viewer. Other movement approaches also can be used, such as double clicking the mouse at the desired location in the auxiliary window in order to move the graphical symbol representing the visual camera. A viewer also can be allowed to adjust the camera from the primary viewer, whether allowed to make an adjustment within a given cell or between cells. It can be more difficult to precisely place the camera using the primary viewer, however, as the display only allows movement along a 2D plane. Icons can always be used to allow the camera to move along any axis at a given time, in order to allow movement in three dimensions.

A graphical symbol for the virtual camera can include an orientation symbol that the user can drag and rotate to adjust the orientation of the virtual camera. This can be done to view all four walls of a room, for example, without moving the location of the camera. The adjustment in orientation can be done using a 2D auxiliary viewer or a 3D primary viewer. A system processor can automatically adjust the virtual camera in the principal viewer (and the graphical symbol in any auxiliary viewers) to match the new position and orientation.

It also can be possible to overlay a graphical outline of a limit box or sphere on any of the auxiliary viewers. The graphical outline can be used to make geo-data outside the outline hidden or transparent in the principal viewer, while the geo-data inside the outline is visible inside the principal viewer. The outline can be used in conjunction with grid cells marked as visible, hidden, or transparent.

The rendering of the geo-data can follow any of a number of cases, such as where the geo-data is inside the outline. When the outline is completely inside a cell or series of cells, the system can be setup to show all geo-data inside the outline using the rendering selection for the selected cell, while the geo-data outside the outline uses the rendering selection for adjacent cells. The user also can specify a specific rendering for the geo-data inside the outline, such that the geo-data inside the outline can be shown whether or not the cell was selected to be visible. Similarly, the user can specify the rendering for data outside the outline. For instance, geo-data outside the outline can be hidden even if that geo-data is in a cell that is marked to be shown. A precedence still can apply, such that if a user selects to make geo-data outside the outline transparent, and the cell is marked as hidden, then the geo-data outside the outline can be hidden. If cell is marked shown (transparent or not), and the inside (or outside) of the outline is selected to be shown (transparent or not), the geo-data can be rendered using a transparency computed by a formula such as:

$$\text{\% Transparency of geo-data} = (100 - (100 - Y) * (100 - X))$$

where
X=% transparency of geometric outline
Y=% transparency of cell

Figure 9A:
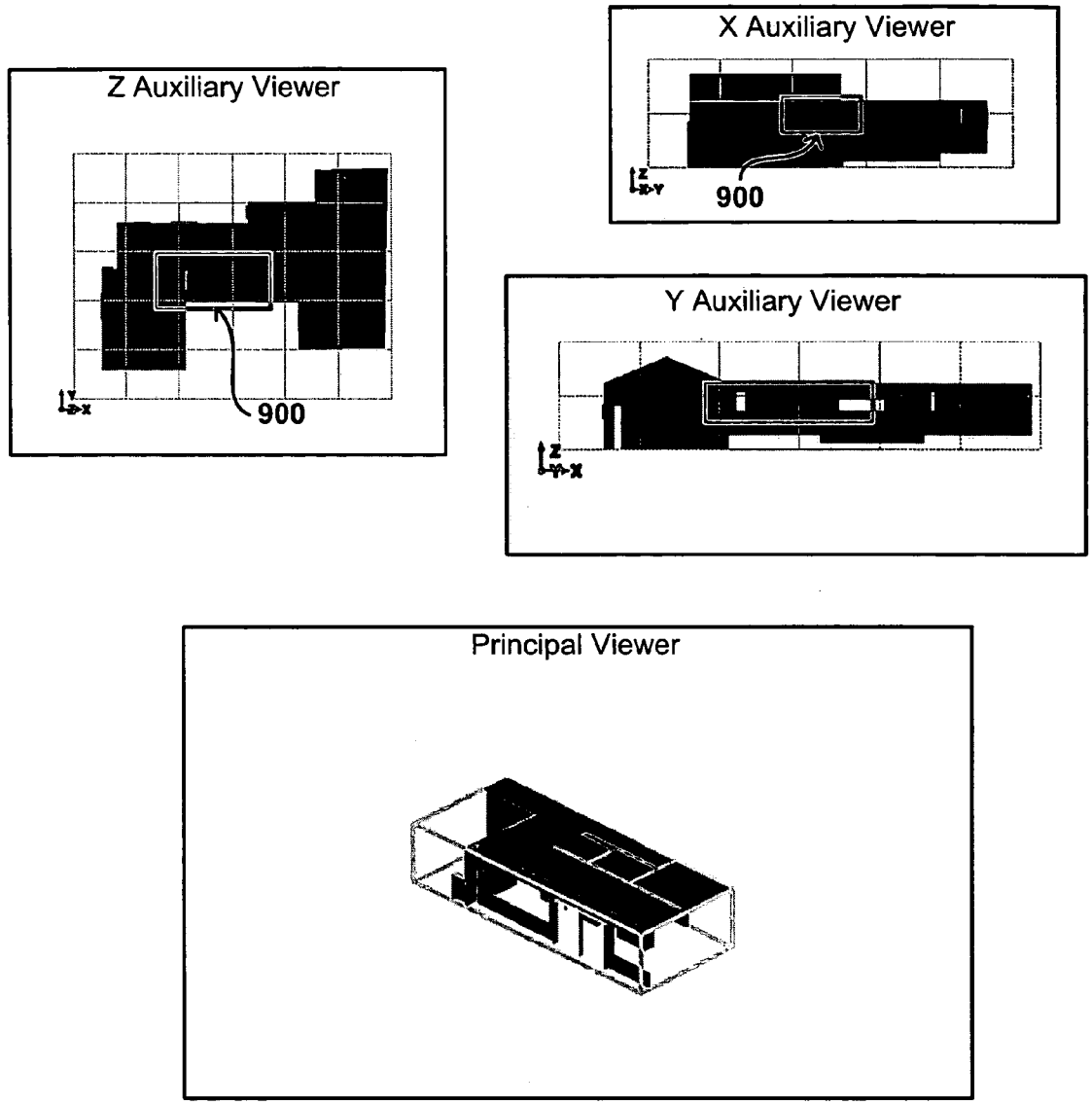
FIG. 9 is a diagram showing (a) a limit box and (b) a limit sphere with the viewers of FIG. 2.
Figure 9B:
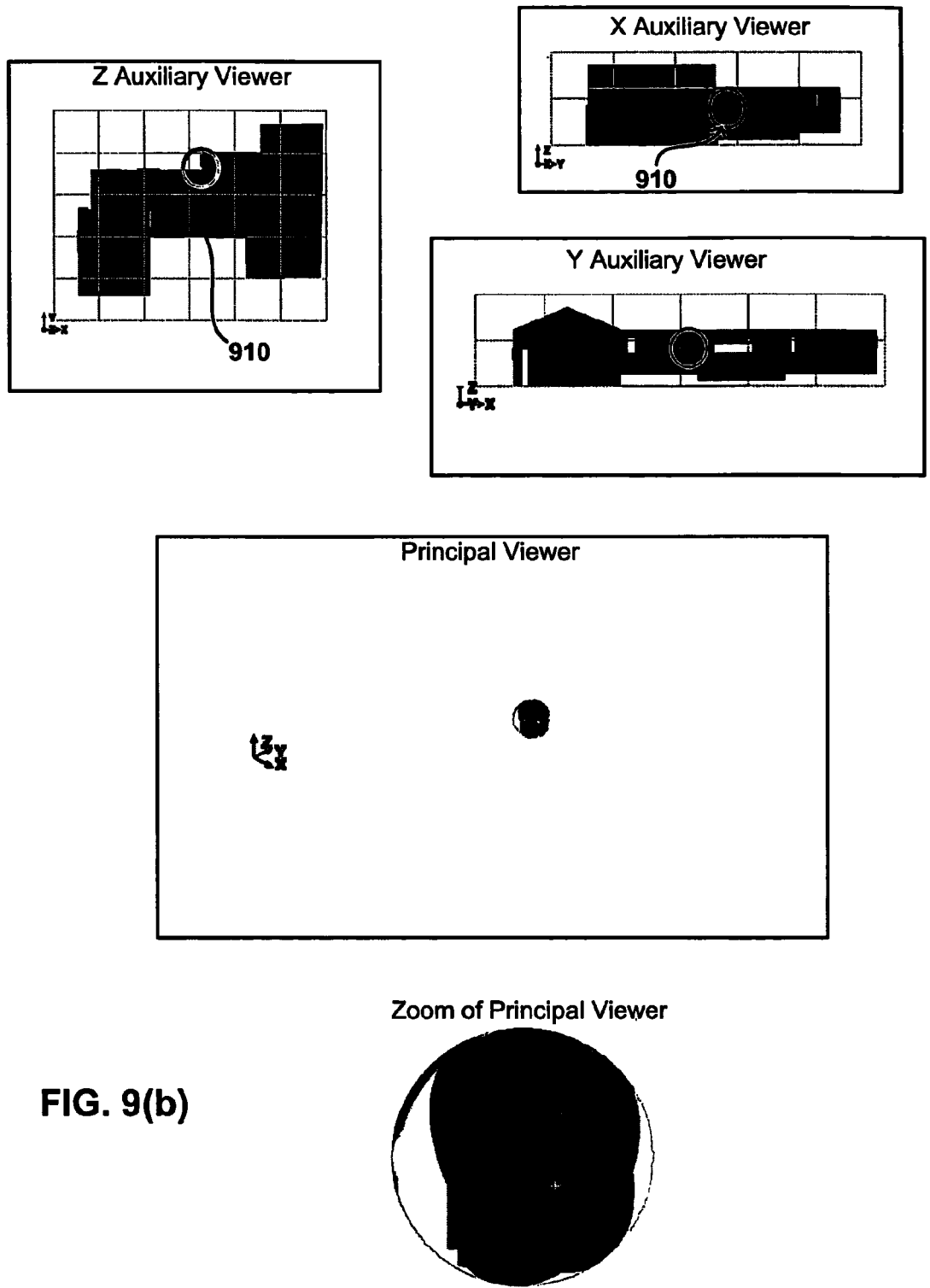

The user can adjust the position and size of the outline in the auxiliary viewers. The position can be adjusted in one embodiment by selecting and dragging the outline in any of the 2D auxiliary viewers. The size can be adjusted by selecting the edge of the outline and dragging to stretch the outline to the desired size. FIG. 9(a) shows an example using a limit box 900 to control what is displayed on the principal viewer, while FIG. 9(b) shows a limit sphere 910. The position and size of the outline in the principal viewer and auxiliary viewers can be updated simultaneously, such that the user immediately sees the rendered effect of the changes to the outline.

A system in accordance with one embodiment also allows for the browsing of any annotated information attached to the geo-data. A user can select a cell or set of cells using at least one of the primary or auxiliary viewers, and can activate an information browser capable of displaying the annotated information for the selected cells. This information can be displayed in any appropriate way, such as in a table, list, or graph. The information included for a cell can include information such as: images for the cell, such as color, black and white, or multispectral images related to a portion of the data in the cell (such as a picture of a stairwell in an entryway); nominal information such as names, locations, station names, room names, addresses, phone numbers, people, and group names; as well as construction and/or maintenance information such as building systems, part numbers, and maintenance responsibilities.

The user can quickly use this information browsing apparatus to inspect the images, in order to determine if the geo-data in a specific grid cell is of further interest. For instance, a user might not be able to determine the location of a specific feature or object using only point data, but can easily determine the location by viewing an image for each of the various cells being displayed. The system can reference the geo-data in any selected cell(s) and check for references to images. If any images are found, the system can display a list or series of thumbnail images from which the user can choose, or the system can automatically launch an image browser with those referenced images.

Embodiments also can allow for the use of multiple levels. For example, a coarse grid can be created and used to isolate a relatively large working region of cells from the data set. This can be similar to level-based partitioning of data subsets to be loaded and analyzed, such as is described in U.S. patent application Ser. No. 11/076,220, incorporated by reference above. The user can focus the auxiliary viewers on the selected region of cells and create a new cell grid at a finer resolution. The system can maintain the unselected cells in memory, or can delete those points from memory and load additional points for the subset to be used in the display of the cells. This process can continue for a number of iterations, with a user zooming in to different locations of interest. Each time the user selects a smaller subset, an additional number of points can be loaded for that subset, up to the maximum resolution or memory capacity of the workstation. The user can maneuver back and forth between various grid levels, with the system automatically changing resolution, loading and deleting points as needed. As only one level of cell grids is visible in the auxiliary viewers or tabular list view at any one moment of time, finer resolution grids can be limited by the selections of coarser resolution grids that preceded. It still can be possible to move the virtual camera, even if the resultant high resolution display would have fallen outside the coarse grid. The system also can display a list or series of images showing recent grid levels, such that the user can easily maneuver between levels. A system also can have multiple viewers that allow a user to view multiple layers simultaneously.

Although described primarily with respect to rectilinear 3D grid cells, embodiments in accordance with the present invention can utilize 2D or 3D cells of non-Cartesian geometry, such as: a geodetic array of cells divided along latitude/longitude or polar coordinates, a Mercator projection, or irregular cell boundaries such as state plane coordinate systems or Voronoi cell divisions. Working with such cell types would differ primarily in the projection methods used to produce 2D auxiliary views of the cell grid structure and the mapping of operator pointer selections on the auxiliary viewer to grid cell selections.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method of visualizing geometric data for an object, comprising the steps of:
    querying a database to load an individual point cloud subset corresponding to a lower resolution point sampling of the geometric data sized to fit in resident memory, wherein each point of the individual point cloud subset is defined by a measured location in 3D space of a coordinate system;
    displaying the individual point cloud subset in a primary viewing window configured for displaying point cloud data and at least one auxiliary viewing window configured to display the individual point cloud subset from at least one of the x, y, or z directions;
    allowing a user to select a portion of the displayed individual point cloud subset in the at least one auxiliary window;
    displaying the selected portion in the primary viewing window using a first rendering and displaying an unselected remainder of the individual point cloud subset in the primary viewing window using a second rendering; and
    overlaying the individual point cloud subset with a primary grid in the primary viewing window and an auxiliary grid in each auxiliary viewing window, the auxiliary grid corresponding to a view of the primary grid in the respective auxiliary viewing window, the primary grid including rectilinear boxes that enclose isolated selectable regions of the geometric data, wherein the primary viewing window presents a three-dimensional representation of the individual point cloud subset, and each auxiliary window presents a two-dimensional representation of the point individual cloud subset; and
    allowing a user to apply at least one additional grid structure having a cell structure that is different from a cell structure of the primary grid, each additional grid structure further having a cell structure that is different from any other additional grid structure.

2. A method according to claim 1, wherein:
the two-dimensional representation of the individual point cloud subset corresponds to a plane view defined by two primary axes of the primary grid.

3. A method according to claim 1, wherein:
the user selects a portion of the individual point cloud subset displayed in the primary viewing window by selecting at least one cell in an auxiliary grid of the at least one auxiliary viewing window.

4. A method according to claim 3, wherein:
the user selects the portion using a process selected from the group consisting of a cell-by-cell selection, drag cell selection, and fence cell selection.

5. A method according to claim 3, wherein:
there are three auxiliary viewing windows, each corresponding to a view along a primary axis of the primary grid in the primary viewing window, and the user selects cells using at least one of the three auxiliary viewing windows.

6. A method according to claim 1, wherein:
each of the first and second renderings is selected from the group consisting of opaque, invisible, and transparent.

7. A method according to claim 1, further comprising:
loading additional points from the point cloud that correspond to the selected portion of the individual point cloud subset.

8. A method according to claim 1, further comprising:
unloading points from the individual point cloud subset that correspond to the unselected remainder of the individual point cloud subset.

9. A method according to claim 3, wherein:
selecting a cell in an auxiliary grid of the at least one auxiliary viewing window selects every cell in one of a row and column of the primary grid containing that cell, the selected row or column being represented by the selected cell in the auxiliary viewing window.

10. A method according to claim 1, further comprising:
overlaying a map of the object over the displayed individual point cloud subset in the at least one auxiliary viewing window.

11. A method according to claim 1, further comprising:
adjusting a viewpoint in the primary viewing window from which the individual point cloud subset is displayed.

12. A method according to claim 11, wherein:
the viewpoint is adjusted by adjusting a graphical representation of a virtual camera in the at least one auxiliary viewing window.

13. A method according to claim 12, wherein:
the graphical representation can be adjusted by at least one of position and orientation.

14. A method according to claim 1, further comprising:
selecting at least one of a point density and a maximum size for the individual point cloud subset to be loaded from the database.

15. A method according to claim 14, further comprising:
allowing a user to adjust one of the point density and maximum size.

16. A method according to claim 1, wherein:
the geometric data contains spatial information such that a query does not have to analyze every geometric data point in the database.

17. A method according to claim 1, wherein:
the geometric data contains spatial information such that a query can return a substantially evenly-spaced individual point cloud subset from the geometric data point in the database.

18. A method according to claim 1, wherein:
the user can adjust a point density of at least one of the selected portion and unselected remainder.

19. A method according to claim 1, wherein:
the user can adjust a display color of at least one of the selected portion and unselected remainder.

20. A method according to claim 1, further comprising:
allowing a user to adjust at least one of a size, number, and orientation of cells of the primary grid.

21. A method according to claim 1, further comprising:
displaying an information window containing information about cells in the primary grid.

22. A method according to claim 1, further comprising:
allowing a user to select a precedence determination for points in the individual point cloud subset having more than one rendering selection.

23. A method according to claim 1, further comprising:
displaying annotated information attached to the data in the point cloud subset.

24. A method according to claim 1, further comprising:
displaying an image related to the individual point cloud subset being viewed in the primary viewing window.

25. A user interface for visualizing stored geometric data for an object, comprising:
a display device operable to display to a user a primary viewing window configured for displaying stored point cloud data and at least one auxiliary window configured to display]an individual point cloud subset from at least one of the x, y, or z directions, the display device operable to receive the individual point cloud subset, corresponding to a point sampling across the geometric data, and display a three- dimensional representation of the individual point cloud subset in the primary viewing window, each of the at least one auxiliary window operable to display a two-dimensional representation of the individual point cloud subset; and
a selection device in communication with the display device and operable to allow a user to select a portion of the displayed individual point cloud subset in the at least one auxiliary window, whereby the selected portion is displayed in the primary viewing window using a first rendering and an unselected remainder of the individual point cloud subset is displayed in the primary viewing window using a second rendering, wherein the selection device allows a user to select at least one of a point density and a maximum size for at least one of the individual point cloud subset, the selected portion, and the unselected remainder and the point cloud data to provide an evenly-spaced set of point cloud data derived from the stored geometric data for the at least one of the individual point cloud subset, the selected portion, and the unselected remainder from the geometric data, wherein each point of the individual point cloud subset is defined by a measured location in 3D space of a coordinate system, wherein the display device is further operable to overlay the individual point cloud subset with a primary grid in the primary viewing window and an auxiliary grid in each auxiliary window, each auxiliary grid corresponding to a view of the primary grid along a primary axis of the primary grid and the primary viewing window presents a three-dimensional representation of the individual point cloud subset, and each auxiliary window presents a two-dimensional representation of the point individual cloud subset.

26. A user interface according to claim 25, wherein:
the selection device allows the user to select the portion of the displayed individual point cloud subset by selecting a number of cells in at least one auxiliary grid.

27. A user interface according to claim 25, wherein:
each of the first and second renderings is selected from the group consisting of opaque, invisible, and transparent.

28. A user interface according to claim 25, wherein:
the selection device allows the user to adjust a viewpoint in the primary viewing window from which the individual point cloud subset is displayed.

29. A user interface according to claim 28, wherein:
the selection device allows the user to adjust the viewpoint by adjusting a graphical representation of a virtual camera in the at least one auxiliary viewing window.

30. A user interface according to claim 25, wherein:
the number of points used to display the individual point cloud subset in the primary viewing window can be adjusted based on the selected portion.

31. A system for visualizing geometric data for an object, comprising:
resident memory operable to receive and store at least a portion of the geometric data;
a processing device operable to query a data storage device in order to load an individual point cloud subset of the geometric data into the resident memory, the individual point cloud subset corresponding to a lower resolution point sampling of the geometric data sized to fit in the resident memory, wherein each point of the individual point cloud subset is defined by a measured location in 3D space of a coordinate system;
a display device in communication with the processing device and operable to display a primary viewing window configured for displaying point cloud data and at least one auxiliary viewing window, the at least one auxiliary viewing window configured to display the individual point cloud subset from at least one of the x, y, or z directions, the display device operable to display a three-dimensional representation of the individual point cloud subset in the primary viewing window and a two-dimensional representation of the individual point cloud subset in each of the at least one auxiliary viewing window;
a selection device in communication with the display device and processing device and operable to allow a user to select a portion of the displayed individual point cloud subset in the at least one auxiliary viewing window, whereby the selected portion is displayed in the primary viewing window using a first rendering and an unselected remainder of the individual point cloud subset is displayed in the primary viewing window using a second rendering; and the selection device allowing a user to apply at least one additional grid structure having a cell structure that is different from a cell structure of the primary grid, each additional grid structure further having a cell structure that is different from any other additional grid structure.

32. A system according to claim 31, wherein:
the selection device allows the user to adjust a viewpoint in the primary viewing window from which the individual point cloud subset is displayed.

33. A system according to claim 32, wherein:
the selection device allows the user to adjust the viewpoint by adjusting a graphical representation of a virtual camera in the at least one auxiliary viewing window.

34. A system according to claim 31, wherein:
the selection device allows a user to select at least one of a point density and a maximum size for at least one of the individual point cloud subset, the selected portion, and the unselected remainder.

35. A system according to claim 31, wherein:
the display device is further operable to adjust the number of points used to display the individual point cloud subset.

36. A system according to claim 31, further comprising:
a scanning laser system in communication with the processing device and operable to scan the object to produce the geometric data.

* * * * *